United States Patent
Vogel

[11] Patent Number: 5,847,943
[45] Date of Patent: Dec. 8, 1998

[54] METHOD AND DEVICE FOR CONTROLLING A FOUR-DIMENSIONAL VECTOR FOR A CONTROLLED SYSTEM BY MEANS OF A DISCRETE-VALUE CONTROL ELEMENT WITH A LIMITED SWITCHING FREQUENCY

[75] Inventor: Reinhard Vogel, Herzogenaurach, Germany

[73] Assignee: Siemens Aktiengesesellschaft, München, Germany

[21] Appl. No.: 11,951

[22] PCT Filed: Aug. 20, 1996

[86] PCT No.: PCT/DE96/01546

§ 371 Date: Feb. 24, 1998

§ 102(e) Date: Feb. 24, 1998

[87] PCT Pub. No.: WO97/08814

PCT Pub. Date: Mar. 6, 1997

[30] Foreign Application Priority Data

Aug. 31, 1995 [DE] Germany .................. 195 32 142.1

[51] Int. Cl.⁶ .................................................. H02M 5/45
[52] U.S. Cl. ............................................. 363/37; 363/34
[58] Field of Search .................................. 363/34, 35, 37, 363/39, 40, 41, 43, 50, 55, 95, 96, 97; 318/803, 805, 808, 811; 323/205, 207; 364/148.09, 176

[56] References Cited

U.S. PATENT DOCUMENTS

| | | | |
|---|---|---|---|
| 5,280,419 | 1/1994 | Amler | 363/37 |
| 5,309,353 | 5/1994 | Schauder et al. | 363/39 |
| 5,343,139 | 8/1994 | Gyugyi et al. | 363/39 |
| 5,552,977 | 9/1996 | Xu et al. | 363/41 |
| 5,567,994 | 10/1996 | Davis et al. | 363/39 |
| 5,627,734 | 5/1997 | Karlecik-Maier | 363/35 |
| 5,661,645 | 8/1997 | Hochstein | 363/89 |
| 5,708,346 | 1/1998 | Schob | 318/803 |

FOREIGN PATENT DOCUMENTS 0 504 449 A1  9/1992  European Pat. Off. .
0 505 591 A1  9/1992  European Pat. Off. .

OTHER PUBLICATIONS

O. Niermeyer, D. Schröder, Current Source Inverer With GTO–Thyristors and Sinusoidal Motor Currents, pp. 772–780 (1993).

Hombu et al., "A Current Source GTO Inverter With Sinusoidal Inputs and Outputs", IEEE Trans.on Ind. App., vol. 1A–23, No. 2, pp. 247–255 (Mar./Apr. 1987).

Sato et al., "State Feedback Control of Current–Type PWM AC–to–DC Converters", IEEE Trans. on Ind. App., vol. 29, No. 6, pp. 1090–1096 (Nov./Dec. 1993).

Holtz et al., "Optimal Synchronous Pulsewidth Modulation with a Trajectory–Tracking Scheme for High–Dynamic Performance", IEEE Trans. on Ind. App., vol. 29, No. 6, pp. 1098–1105 (Nov./Dec. 1993).

(List continued on next page.)

*Primary Examiner*—Adolf Berhane
*Attorney, Agent, or Firm*—Kenyon & Kenyon

[57] ABSTRACT

A method of controlling a four-dimensional vector for a controlled system by means of a discrete-value control element with a limited switching frequency. Reference values of a four-dimensional vector of the controlled system at the chosen switching time are calculated as a function of a selected reference switching status with its associated switching time. These reference values are used to calculate the time remaining to the next switching operation, thus enabling the energy difference to be minimized. The actual switching time and the required switching status are determined by a plausibility check. This provides a modulation and control method for high-power drives which combines the high steady-state quality of optimized pulse patterns with the high dynamic characteristics of multi-dimensional, status-oriented on-line control.

7 Claims, 10 Drawing Sheets

OTHER PUBLICATIONS

Holtz et al., "The Trajectory Approach—A New Method for Minimum Distortion PWM in Dynamic High–Power Drives", IEEE Trans. on Ind. App., vol. 30, No. 4, pp. 1048–1057 (Jul./Aug. 1994).

Holtz et al., "Fast Current Trajectory Tracking Control Based on Synchronous Optimal Pulsewidth Modulation", IEEE Ind. App. Society, (1994).

G. Amler, "A New Control Method For Current–Source Inverters With Self–Extinction Devices, Combining Low Distortion Of Voltage and Current With Fast Dynamic Response", EPE Firenze, pp. 1–5 (1991).

METHOD AND DEVICE FOR CONTROLLING A FOUR-DIMENSIONAL VECTOR FOR A CONTROLLED SYSTEM BY MEANS OF A DISCRETE-VALUE CONTROL ELEMENT WITH A LIMITED SWITCHING FREQUENCY

FIELD OF THE INVENTION

The present invention is directed to a method for controlling a four-dimensional vector for a controlled system by means of a discrete-value control element with a limited switching frequency. The present invention is also directed to a device for implementing this method.

BACKGROUND INFORMATION

Asynchronous machines that are supplied from current source PWM (pulse-width modulation) inverters are especially useful for high-speed, high-power drives, that is, those drives that operate in accordance with more than 1 MW. These types of converters consist of an impulse-commutated GTO inverter on the load side, while a line-commutated thyristor converter is used on the line side.

The use of shut-off valves even on the line side makes it possible to build a high-quality, steady-state, and dynamic power control element that produces only minor disturbances on the line side. Nevertheless, the only controllable valves currently available in the specified power range are GTO thyristors. Taking into account the losses produced in the control element, the possible pulse frequency is therefore limited to a few 100 Hz ($f_p \leq 300$ Hz). Due to its low damping, an LC resonant circuit causes considerable problems during transient processes, especially on the line side. An automatic control method with high dynamic characteristics is needed for the line-side impulse-commutated converter in order to actively damp the resonant filter circuit.

If the nominal fundamental frequency of the controlled system is $f_m = 50$ Hz, the ratio between the switching frequency and the nominal fundamental frequency is therefore only $f_p/f_m \leq 6$.

So-called optimized pulse patterns are used with these types of low frequency-response ratios ($f_p/f_m$) in order to minimize the harmonic component in the periodic quantity of the controlled system. The low-pass effect of the controlled system, which is generally present, is not by itself sufficient for this purpose.

Nevertheless, optimizing the switching times with the technical capabilities available today can be done only off-line and only for steady-state operation, due to the complexity of the mathematical relationships. For this purpose, certain idealized assumptions must be made, such as an ideally smoothed direct current or an ideally smoothed direct voltage in the link circuit and the lack of a harmonic component in the "inner" source voltage and/or source current of the manipulated variable.

From a control point of view, modulation using an optimized pulse pattern is therefore a controlled method of determining the switching time with what are in principle poor dynamic characteristics when very fast reference value and disturbance changes occur. Since high-power, impulse-commutated load-side converters do not generally have any extreme requirements regarding the dynamic commutation and disturbance characteristics, modulation with an optimized pulse pattern has been used extensively for this purpose.

Nevertheless, a very different problem arises when using impulse-commutated high-power converters as line-side converters. Because of switching operations on the supply line, short interruptions, etc., the occurrence of fast, transient disturbances must practically always be expected.

High-speed control of the control element on the line side makes it possible, for example, to considerably increase plant availability without having to greatly overdimension the control element.

The dynamic requirements of line-side converter control increase even further due to the ever greater need to have the impulse-commutated converter behave in a more "line-friendly" manner through the use of higher-order filters. The intrinsic damping effect of the LC filters that are used is generally very minor, and, as a result, highly dynamic converter control is required in order to achieve effective, active vibration damping.

If the LC filter is also a functional and indispensable part of a control concept, which is the case, for example, with impulse-commutated current-source converters, a highly dynamic modulation and control method must be available before such a control element can even be used as a line-side converter. A controlled method with switching times calculated off line does not meet these requirements.

Certain publications have presented a highly dynamic automatic control method for large drives with low-speed voltage-source PWM inverters, in which the filter (reactor) represents a first-order system. These publications are respectively cited as J. Holtz, B. Beyer, "Optimal Synchronous Pulsewidth Modulation With A Trajectory-Tracking Scheme For High-Dynamic Performance", IEEE Transactions on Ind. App., Vol. 29, No. 6, November/December 1993, pages 1098 to 1105; J. Holtz, B. Beyer, "The Trajectory Tracking Approach—A New Method For Minimum Distortion PWM In Dynamic High-Power Drives", IEEE Transactions on Ind. App., Vol. 30, No. 4, July/August 1994, pages 1048 to 1057; and J. Holtz, B. Beyer, "Fast Current Trajectory Tracking Control Based On Synchronous Optimal Pulsewidth Modulation", IEEE Industry Applications Society Annual Meeting, Denver, 1994. This highly dynamic automatic control method is also described in European Patent Specification 0 504 449, entitled "Method And Device For Generating Switching-State Signals From A Control-Voltage Vector".

Nevertheless, this method cannot be applied to a current-source converter system, since second-order filter circuits exist on both the line and load sides in this case.

The basic idea behind the method published by Holtz and Beyer is the ability to predict and therefore predictively correct the modulation errors that occur, for example, when the pulse pattern changes at a random (and not optimum) point in time. In order to do this, however, it must be possible to map the applicable status variables of the control element and the controlled system onto one another (in a mathematical sense). This means, for example, that the changes in switching states and switching times of voltage-source inverters (depending on changes in the voltage-time area) must have a clearly predictable effect on changes in the phase current development of the controlled system, so that the variation over time of this current can be clearly converted back to a predictable change in the voltage-time area.

Nevertheless, this can be successful only if the controlled system is a first-order filter circuit. Conversely, if the controlled system contains another different type of energy storage device that would be useful for the examined transient processes during pulsation (e.g. a filter capacitor), this method can no longer be used. Changes in the voltage-time plane of the control element, for example, can no longer be clearly converted to a change in the phase current variation of an asynchronous machine arranged in the control system. If the control system in the sense of the examined transient processes during pulsation is a higher-order system (usually a second-order one), other methods for the highly dynamic determination of the switching times and states must therefore be used.

Amler developed a highly dynamic, status-oriented automatic control method for current-source inverters with shut-off valves. This method is described in greater detail, for example, in the European Patent Specification 0 505 591, entitled "Method and Switching Arrangement for Controlling a Two-Dimensional Vector for a Controlled System by Means of a Discrete-Value Control Element with a Limited Switching Frequency" and in the article "A New Control Method for Current-Source Inverters with Self-Extinction Devices, Combining Low Distortion of Voltage and Current with Fast Dynamic Responses", EPE Florence, 1991, pages 1 to 6.

This control method involves the complete on-line calculation of all switching operations based on a simplified status-oriented description of the system performance.

The control method proposed by Amler is not suitable for practical implementation in the application under examination.

Below is an explanation of the reasons why this method does not demonstrate a satisfactory operational performance at very low frequency-response ratios ($f_p/f_m \leq 6$).

To do this, we must first establish the fact that the energy status of a controlled system with LC filters can be clearly described only at the time when both relevant status variables (capacitor voltage on the complex plane and reactor current on the complex plane) are examined simultaneously and in terms of their interaction with one another.

In contrast, Amler starts with the assumption that optimum control of one two-dimensional vector (e.g. voltage or current on the complex plane) is sufficient. Each of the other relevant multi-dimensional status variables is controlled only indirectly via the integral of the first status variable, and therefore only as an average.

The extent to which this control method produces switching time calculation results that are sufficiently accurate for practical applications now depends on the influence that the link which nearly always exists between the two two-dimensional vectors (voltage and current) has on the calculation. Nevertheless, the influence that this has on the calculation greatly depends on the ratio between the time segments to which the calculation equations relate and the resonant frequency period $T_{Res}$ of the controlled LC system.

In simplified terms, the sampling or computation period is decisive for the dynamic characteristic of this behavior. In practice, a sufficiently small period, compared to resonant frequency period $T_{Res}$, can be selected for the application under consideration. A satisfactory dynamic characteristic can therefore be achieved with the simplified equations given in EP 0 505 591 for calculating the time remaining to the next switching operation. Nevertheless, since the reference values used represent only one two-dimensional reference status vector, this control method is stable only to a limited degree.

The extent to which the calculated reference values are indeed the optimum reference switching points of the control element is decisive for a steady-state operating performance. The following can be said in this regard:

Because the duration of the time segments and the total time given in EP 0 505 591 are decisive for calculating the reference switching points, they cannot be disregarded vis-à-vis the resonant frequency period. This is because the resonant frequency and the valve switching frequency are within the same magnitude in the high-power converter application under consideration. Changes in a status variable can therefore no longer be attributed solely to the effect of the actual value of the manipulated variable (converter switching states), since an energy exchange that is not to be disregarded additionally takes place between the two controlled system storage devices in the time segments described in EP 0 505 591.

It is therefore not sufficient to consider the change of only one status variable in this case, since the link between both status variables has considerable influence on the calculation result. In particular, the assumption in EP 0 505 591 that the only status variable discussed changes linearly, while the other status variable remains constant, is too much of an approximation.

In the case of direct-current-source converters, the use of magnetic energy storage devices produces in the link high ohmic losses that are higher than in the case of voltage-source converters or capacitive energy storage devices.

In the case of direct-current-source converters, it is useful, for power loss reasons, to set the link voltage (and therefore the available link output) only to the level necessary for covering the currently required mechanical input. The power of the overall drive is therefore controlled almost exclusively by means of the impulse-commutated line-side converter. An automatic control method that is suitable for this converter must meet the following requirements, taking into account the low maximum switching frequency allowed. For steady-state operation, there must be: an operation with working-point or load-dependent control; a high degree of modulation (maximum modulation factor $A \geq 0.95$) in relation to a full-block timing; a power factor of cos $\phi \approx 1$ in the largest possible operating range; and low line-current harmonics. As for the dynamic characteristics, there must be: high dynamic characteristics with regard to disturbance correction, in order to effectively suppress the excitation of the resonant filter circuit due to line effects (line harmonics, switching operations on the line) and due to the load-side inverter (interharmonics); and high dynamic characteristics for reference variable changes, since the power control is carried out almost exclusively by means of the line-side converter.

The line-side converter must therefore meet high dynamic requirements relating to disturbance correction. A controlled method in which switching times are calculated off-line does not meet these requirements.

SUMMARY OF THE INVENTION

An object of the present invention is to provide a method and a device for controlling a four-dimensional vector for a controlled system by means of a discrete-value control element with a limited switching frequency.

In order to achieve this object, the present invention selects a reference switching status and an associated first switching time. The reference switching status is selected from a pulse pattern table as a function of a modulation factor and a fundamental frequency phase angle. The present invention then calculates at least one reference value of the four-dimensional vector at the selected first switching time as a function of the pulse pattern, the reference switching status, a control element reference output value, and a determined fundamental component of a voltage of the controlled system. The present invention calculates the reference value of the four-dimensional vector using a plurality of controlled system parameters. Next, the present invention calculates a time remaining to a next switching operation so as to minimize a difference between the calculated reference value of the four-dimensional vector and an actual value of the four-dimensional vector at an actual switching time. A plausibility check of the calculated remaining time is then performed as a function of a plurality of certain switching time limit values; the selected reference switching status is then provided as a required switching status at the actual switching time, wherein the selected reference switching status is provided as a function of the plausibility check. The present invention then generates a plurality of control signals for the discrete-value control element, wherein the control signals are generated on the basis of the required switching status.

Underlying the method and device of the present invention are certain basic concepts. In particular, the pulse patterns that are calculated off-line are used to determine the reference energy values of the controlled system. These reference energy values describe the reference states of the LC filter concerning both the fundamental and harmonic frequency (and therefore the controlled system as well) at the discrete switching times of the optimized pulse pattern for undisturbed steady-state operation. The purpose of status-oriented control is to adjust the actual switching times in such a way that the difference between the reference and actual filter energy values is minimized at the moment of switching. Since the new switching times that have been determined are initially only the result of a purely mathematical calculation, they must be subjected to a plausibility check in order to draw a reference to physical reality.

The solution to these problems provided by the invention lies in combining the advantages of the optimized pulse patterns calculated off-line (high steady-state quality) with the high dynamic characteristics of multi-dimensional, status-oriented on-line control.

The individual steps in applying this method involve such steps as calculating and selecting the optimized pulse patterns. The optimized pulse patterns are calculated off-line under the following criteria: there must be a low harmonic distortion of the line current, an avoidance of filter circuit excitation, a compliance with minimum switching times, and a maximum modulation that is at its highest.

The pulse patterns are optimized off-line in accordance with the idealized assumption that the line voltage and link current are free of harmonics. Since the fundamental frequency of the controlled system (line frequency) is more or less constant, different pulse patterns are needed only in order to implement different modulation factors. For example, changing to a different pulse pattern takes place only if such a change is necessary in order to maintain the minimum valve turn-on and turn-off times when changes to the fundamental frequency modulation occur. As a result, considerably fewer different pulse patterns are needed in comparison to the use of optimized pulse patterns in load-side converters. The pulse pattern that is suitable for the current working point is chosen on-line on the basis of the fundamental frequency modulation needed in a quasi-steady state.

The corresponding reference values for the four-dimensional vector of the controlled system are calculated on line for the reference switching times specified by the selected pulse pattern. This on-line calculation is also carried out under idealized assumptions (harmonic-free line voltage and link current). The calculated reference values of the four-dimensional vector for the controlled system therefore describe the reference energy status of the resonant filter circuit at discrete switching times for undisturbed, steady-state balanced operation under ideal conditions.

As for the calculation of the switching times, there are reference values that pertain to the two controlled-system status variables calculated at the reference switching times of the optimized pulse pattern. These reference values represent the reference energy values of the filter in the form of a four-dimensional vector. The goal of status-optimized control is to select the actual switching times so as to minimize the difference between the reference value of the resonant circuit energy at the selected time of the optimized pulse pattern and the actual value at the moment of switching.

By combining the high steady-state quality of pulse patterns that are optimized off-line and the high dynamic characteristics of status control, the present invention is also useful for load-side inverters. The present invention is also suitable for voltage-source PWM inverters and line- or load-side filters. In this case, a constant link voltage must be assumed when calculating the reference energy values on-line.

A device constructed according to the principles of the present invention would include a fundamental frequency reference value calculator that is in communication with a pulse pattern storage device. The device according to the present invention would also include an apparatus, in communication with the pulse pattern storage device, for calculating at least one reference value of the four-dimensional vector. This apparatus would include at least one input for receiving a plurality of controlled system parameters. Also in communication with the pulse pattern device would be an apparatus for performing a plausibility check. The device according to the present invention would further include an apparatus, in communication with at least one output of the apparatus for calculating the reference value of the four-dimensional vector, for calculating an actual switching time. At least one output of the apparatus for calculating the actual switching time would be in communication with at least one input of the apparatus for performing the plausibility check, and the apparatus for calculating the actual switching time would include at least one input for receiving the plurality of controlled system parameters and at least one input for receiving a plurality of actual values of the controlled system. A trigger equipment apparatus would have at least one input in communication with at least one output of the apparatus for performing the plausibility check. The device according to the present invention would also include an apparatus, in communication with the apparatus for calculating the reference value of the four-dimensional vector and with the fundamental frequency reference value calculator, for generating a fundamental component of a controlled-system quantity.

The fundamental frequency reference-value calculator with downstream pulse pattern storage and trigger equipment is known from control circuits for impulse-commutated converters which operate with optimized pulse patterns. In carrying out the method according to the invention, an apparatus for calculating a reference value of the four-dimensional vector for the controlled system, an apparatus for calculating an actual switching time and an apparatus for checking the plausibility may be added to this control circuit.

DETAILED DESCRIPTION

Figure 1:
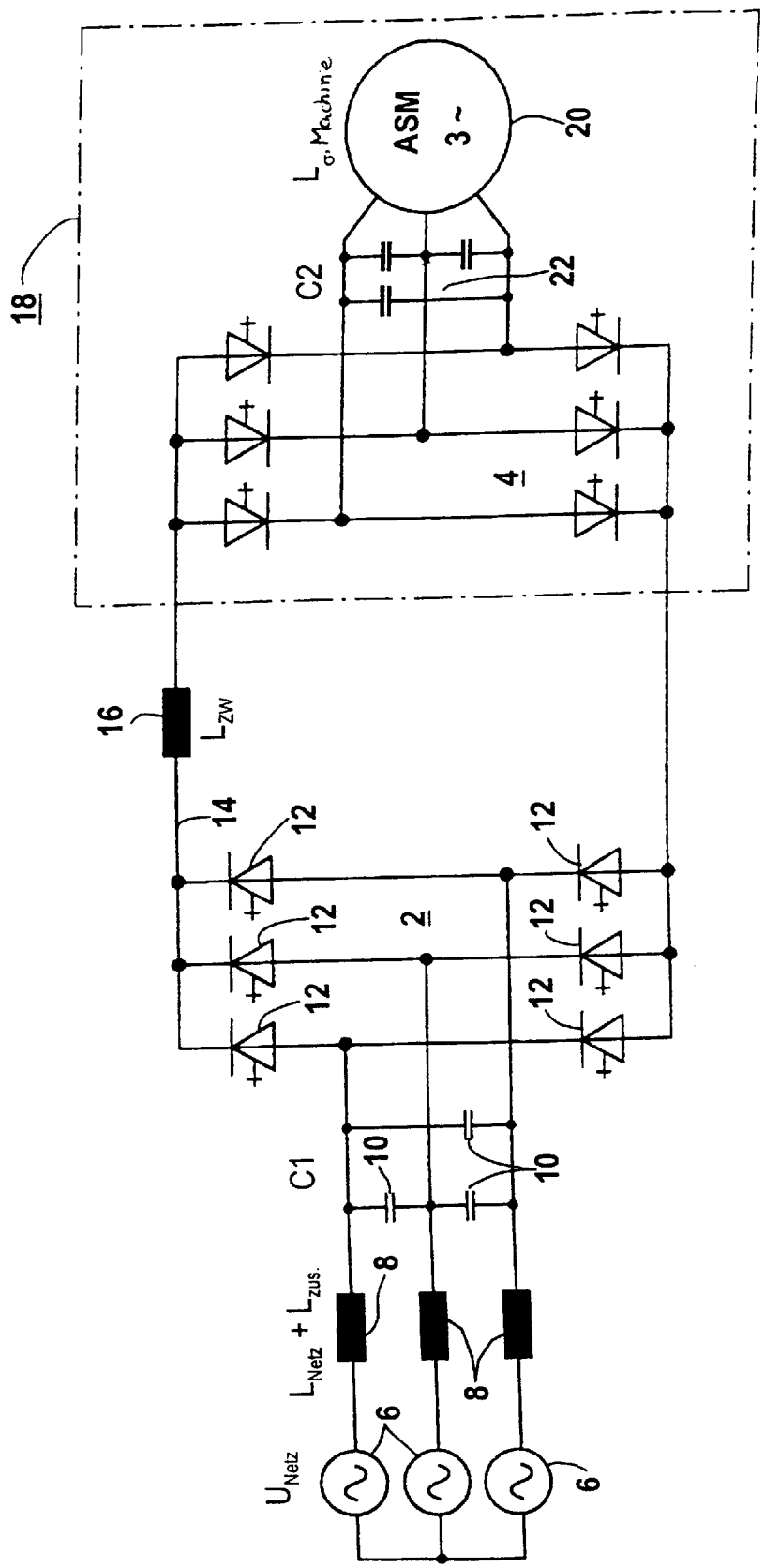
FIG. 1 illustrates a simplified, overall circuit diagram of a PWM converter system for high-power asynchronous machine drives.

FIG. 1 illustrates a simplified overall circuit diagram of a PWM converter system for a high-power asynchronous machine drive. Impulse-commutated converters 2 and 4 are used on both the line and load sides. The line-side impulse-commutated converter 2 in this case is implemented with GTO thyristors 12. The drive system components of the PWM converter system include three three-phase line voltage sources 6, each one having a terminal coupled to one effective, line-side inductor 8 combined into a three-phase reactor. Also included among these drive system components are a plurality of capacitors 10, all of which are three-phase elements as well; these capacitors 10 are used for commutating the valves of line-side converter 2. Together with inductors 8, these capacitors 10 form a resonant filter circuit. Moreover, the three-phase line voltage sources 6, the line-side inductors 8, and the capacitors 10 are collectively referred to herein as controlled system 6, 8, 10. Further, a d.c. link 14 is provided between impulse-commutated converters 2 and 4, and this link 14 includes a smoothing reactor 16.

Load-side inverter 4 is encompassed in FIG. 1 within circuit block 18. Also enclosed therein are asynchronous machine 20 connected to the inverter 4 and a plurality of three-phase capacitors 22, which are also needed on the load side.

The maximum permissible (average) switching frequency $f_p$ of semiconductor valves 12 is only a few 100 Hz, taking into account the losses produced in control element 2; as a rule, this amounts to no more than $f_p$=300 Hz. Since the ratio between the switching frequency and the nominal fundamental frequency is therefore only $f_p/f_m \leq 6$ and since a fundamental frequency of $f_m$=50 Hz is present in controlled system 6, 8 and 10, optimized pulse patterns are used in order to minimize the harmonic component of the periodic quantity of controlled system 6, 8 and 10. Due to the low damping of the resonant LC circuit at the line-side input of control element 2, this resonant LC circuit causes considerable problems during transient processes, especially on the line side. It is not possible to solve these problems solely with pulse patterns that are optimized off-line.

Figure 2:
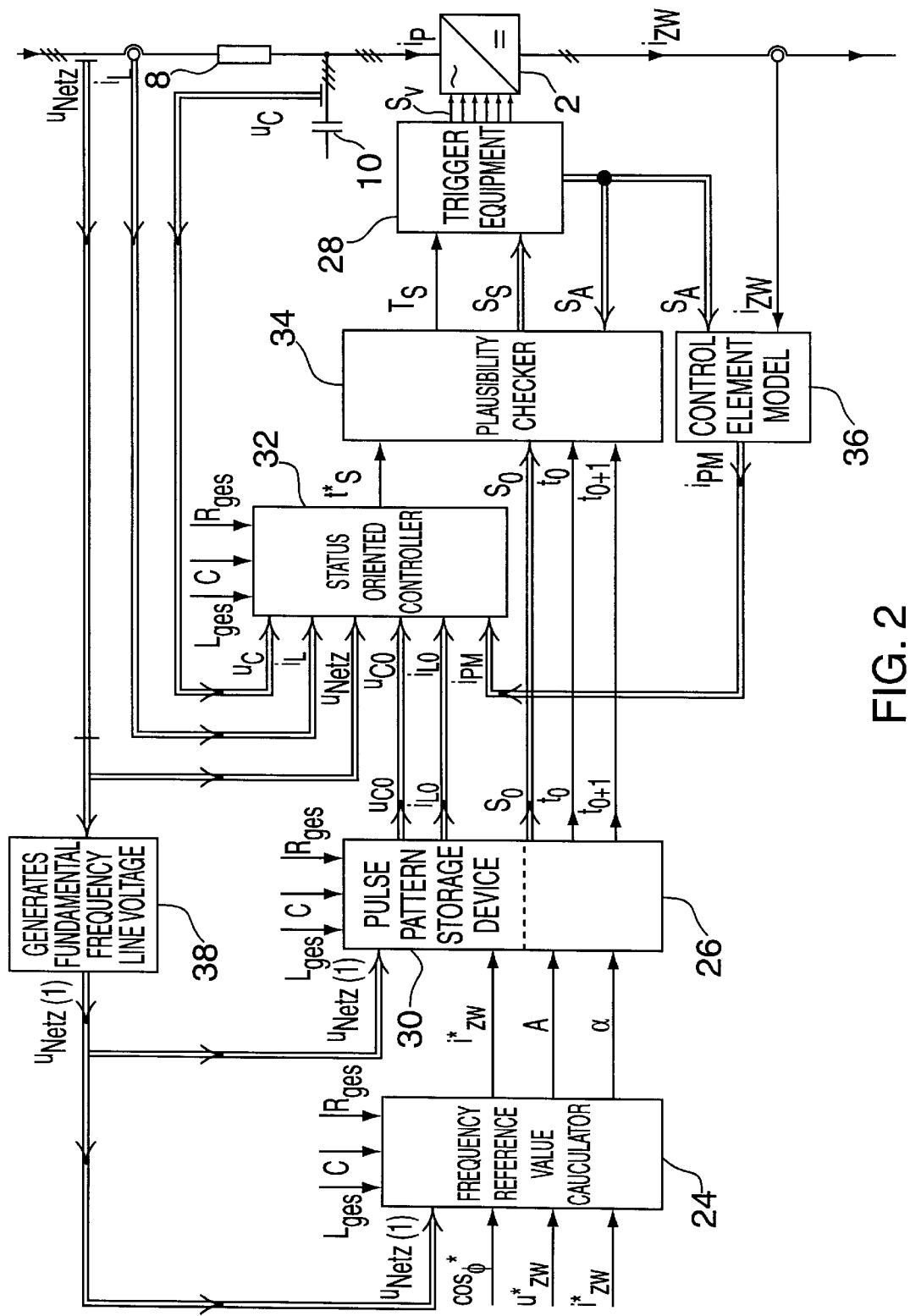
FIG. 2 illustrates a block diagram of the device for implementing the method according to the present invention.

FIG. 2 illustrates a device for implementing a method in accordance with the present invention. In this block diagram, vectors are represented by letters printed in boldface. A fundamental frequency reference value calculator 24, a pulse pattern storage device 26 and trigger equipment 28 are already known from a control circuit of an impulse-commutated converter 2. This fundamental frequency reference value calculator 24 is supplied with several inputs, which include the fundamental component of line voltage $U_{Netz(1)}$, the reference values of output voltage $u^*_{ZW}$ and output current $i^*_{ZW}$ of control element 2, a reference power factor $\cos\phi^*$ and several parameters of controlled system 6, 8 and 10. These parameters include line-side ohmic resistance $R_{ges}$, line-side effective inductance $L_{ges}$, which is represented as three-phase reactor 8, and the capacitance value C of the three-phase capacitor 10.

The reference working point of control element 2 is determined on the basis of these input values. This reference working point is represented by the outputs that calculator 24 produces in response to these inputs. These outputs are the variables of reference modulation factor A of control element 2 and fundamental frequency phase angle $\alpha$ of line-side reference control element current $i^*_p$. A pulse pattern that has been optimized off-line and that is suitable for quasi-steady-state operation is selected from pulse pattern storage device 26 with the aid of reference modulation factor A. Since $\alpha$ also reveals the fundamental frequency phase angle of the pulse pattern, it can be used to obtain the next reference switching state $S_0$ and corresponding switching time to from pulse pattern storage device 26. Using a known control circuit for a control element 2, control signals $S_V$ are generated for discrete-value control element 2 with a limited switching frequency $f_p$ from reference switching status $S_0$ and corresponding switching time $t_0$ by means of trigger equipment 28.

As stated previously, an object of the present invention is to control a four-dimensional vector $u_C$, $i_L$ for a controlled system 6, 8 and 10 by means of a discrete-value control element 2 with a limited switching frequency $f_p$. In order to achieve this object, the method of the present invention is implemented through the operation of apparati 30, 32 and 34. Apparatus 30 is linked to pulse pattern storage device 26 and receives as at inputs the output signals of fundamental frequency reference value calculator 24. The output signals of apparatus 30 are supplied to apparatus 32, which provides its output signal to an input of apparatus 34. This apparatus 34 also has other input lines, which in this configuration are connected to receive the output signals of pulse pattern storage device 26. The output signals of apparatus 34 are supplied to trigger equipment 28.

Apparatus 30 is used for calculating a reference value $u_{C0}$, $i_{L0}$ of a four-dimensional vector $u_C$, $i_L$ for controlled system 6, 8 and 10. These values, which are calculated on-line, describe the energy status of the resonant LC filter circuit at the discrete times for undisturbed steady-state balanced operation under ideal conditions. The energy status at reference switching time $t_0$ is therefore the required four-dimensional reference-value vector, which describes the reference switching point. This means that both status variables $u_C$ (capacitor voltage) and $i_L$ (line current) of controlled system 6, 8 and 10 form the four-dimensional vector of the controlled system, which makes it possible to describe the energy content of the resonant filter circuit unambiguously and completely.

In order to calculate the reference values for status variables $u_{c0}$ and $i_{L0}$ for reference switching times $t_0$ specified by the selected pulse pattern, apparatus 30 is supplied with fundamental component of line voltage $u_{Netz(1)}$, the controlled system parameters $L_{ges}$, C, $R_{ges}$ mentioned above, and the reference value of control element output current $i^*_{ZW}$. The variation of the reference value of control element input current $i_p$ over time is known from control element output current $i^*_{ZW}$ and from the variation over time of the selected optimized pulse pattern. This apparatus 30 is used to calculate the reference energy status of the line-side filter at time $t_0$, and this reference energy status is supplied to the downstream, status-oriented controller embodied as apparatus 32. This reference energy status represents a four-dimensional reference vector, which can be unambiguously described by the reference vector of capacitor voltage $u_{C0}$ at time $t_0$ (two-dimensional) and the reference vector of line current $i_{L0}$ at time $t_0$ (two-dimensional). This four-dimensional reference-value vector $u_{C0}$ and $i_{L0}$ is supplied to apparatus 32 in order to calculate an actual switching time $t^*_S$. Apparatus 32 may also be referred to as a status controller.

Figure 3:
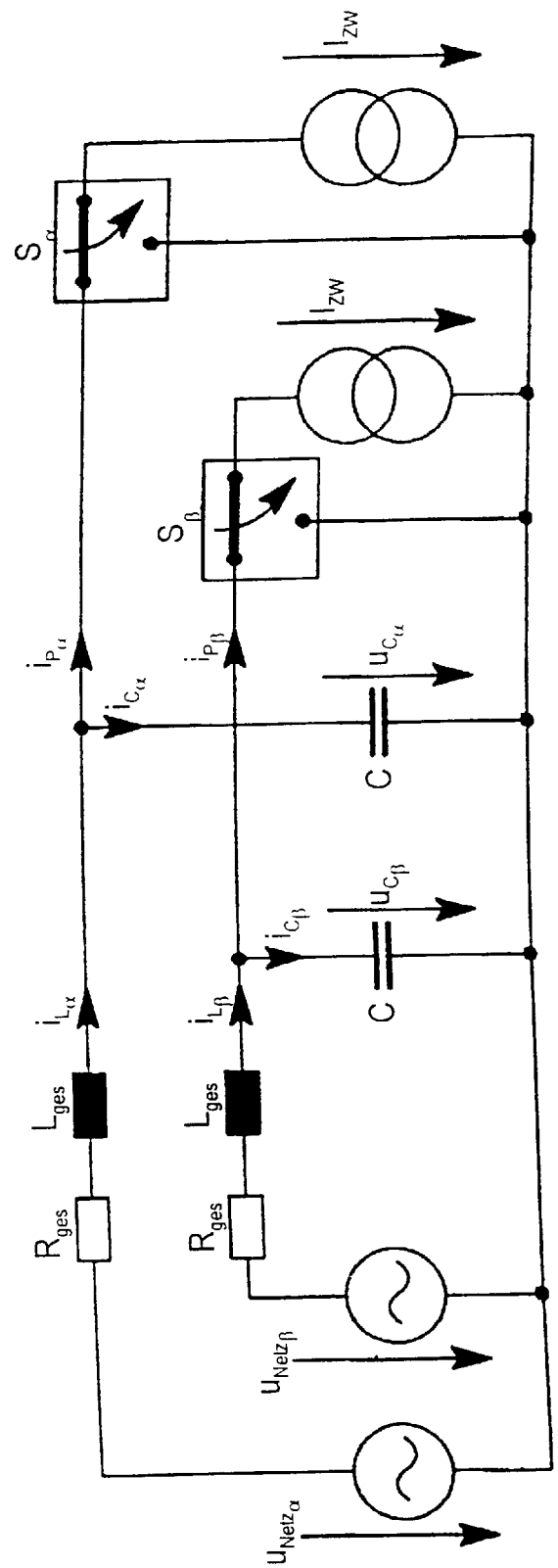
FIG. 3 illustrates a simplified, 2-phase equivalent circuit diagram of the control element.

A suitable coordinate system, which simplifies the solution to the differential equations as much as possible, must be selected for the on-line calculation of values $u_{C0}$ and $i_{L0}$. A calculation using $\alpha$-$\beta$ coordinates with an equivalent circuit diagram as shown in FIG. 3 has proven to be especially advantageous, since line-side converter currents $i_{P\alpha,\beta}$ are segmentally constant variables as a result of link current $i_{ZW}$, which is assumed to be ideally smoothed. Control element 2 is represented by switch function $S_\alpha$ or $S_\beta$, which generate vectors $i_{P\alpha}$ and $i_{P\beta}$ located on the complex plane on the basis of the scalar quantity of link current $i_{ZW}$. On the line side, the line-side and filter reactor impedances are combined to form common ohmic and inductive resistances. Line voltages $u_{S\alpha}$ and $u_{S\beta}$ are equated with the voltages at the converter power terminal. Although this produces a minor error in examining the fundamental frequency (which can be corrected if necessary), it makes it all the more simple to describe the resonant behavior of the filter, which is of primary importance.

Aside from these status variables $u_{C0}$ and $i_{L0}$ of four-dimensional vector uC and $i_L$ for controlled system 6, 8 and 10 status controller apparatus 32 is also supplied with the actual values of status variables $u_C$ and $i_L$, controlled system parameters $L_{ges}$, C, and $R_{ges}$, line voltage $u_L$, and a model status variable $i_{PM}$ of control element input current $i_P$. The function of this status controller 32 is to adjust actual switching time $t_S$ on-line so as to minimize the difference between the reference and actual values of the filter energy at this point in time. The requirement of "minimizing the difference between the reference and actual values of the filter energy" is the optimization criterion required for the current four-dimensional optimization problem.

A number of approaches can be used for the mathematical formulation of this requirement. The solution approaches which produced by far the best simulation results are presented below (minimization of "energy difference $W_\Delta$"). Based on the generally accepted equations for the energy stored in capacitors:

$$W_C = \tfrac{1}{2} \cdot C \cdot u_C^2 \qquad (1)$$

and the energy stored in the inductor:

$$W_L = \tfrac{1}{2} \cdot L \cdot i_L^2 \qquad (2)$$

energy difference $W_\Delta$ can be formulated as follows:

$$W_\Delta = \tfrac{1}{2}[C \cdot (u_{C0} - u_{CS})^2 + L \cdot (i_{L0} - i_{LS})^2] \rightarrow in. \qquad (3)$$

In order to determine switching point $t_S$ with the aid of this equation, unknown status variables $u_{CS}$ and $i_{LS}$ must first be substituted with known values at time $t_S$. In order to do this, the variation over time of status variables $u_C$ and $i_L$ must be described within time period $t_A \leq t \leq t_S$:

$$u_{CS} = u_{CA} + 1/C \cdot \int_{t = t_A}^{t = t_S} (i_L - i_P) dt \qquad (4)$$

$$i_{LS} = i_{LA} + 1/L \cdot \int_{t = t_A}^{t = t_S} (u_{Netz} - R \cdot i_L - u_C) dt \qquad (5)$$

Time $t_A$ in this equation designates the sampling time for actual status variable values $u_{CA}$ and $i_{LA}$. We will note, without proof, that a unique value for switching time $t_S$ can be calculated only if a linear variation over time is assumed for status variables $u_C$ and $i_L$; only one real solution exists in this case. Equations (4) and (5) must therefore be transformed into simple differential equations with constant gradients:

$$u_{CS} = u_{CA} + \Delta t \cdot \dot{u}_C \qquad (6)$$

$$i_{LS} = i_{LA} + \Delta t \cdot \dot{i}_L \qquad (7)$$

where $\Delta t$ indicates the time remaining from sampling time $t_A$ of actual status variable values $u_{CA}$ and $i_{LA}$ to switching time $t_S$ and therefore represents the final required quantity:

$$\Delta t = t_S - t_A \qquad (8)$$

The following further assumptions are necessary in order to perform the calculation with constant gradients in time interval $\Delta t$ under consideration:

$$\text{where } u_{Netz}, u_C, i_L, i_P \approx \text{const.} \qquad (9)$$

and $$u_{Netz} = u_{NetzA} \qquad (10)$$

$$u_C = u_{CA} \qquad (11)$$

$$i_L = i_{LA} \qquad (12)$$

$$i_P = i_{PA} \qquad (13)$$

result in:

$$\dot{u}_C = 1/C \cdot (i_{LA} - i_{PA}) \qquad (14)$$

$$\dot{i}_L = 1/L \cdot (u_{NetzA} - i_{LA} \cdot R_{ges} - u_{CA}) \qquad (15)$$

The linear differential equations for determining status variables $u_{CS}$ and $i_{LS}$ are therefore as follows:

$$u_{CS} = u_{CS} + \Delta t \cdot \dot{u}_C = u_{CA} + \Delta t \cdot 1/C \cdot (i_{LA} - i_{PA}) \qquad (16)$$

$$i_{LS} = i_{LA} + \Delta t \cdot \dot{i}_L = i_{LA} + \Delta t \cdot 1/L \cdot (u_{NetzA} - i_{LA} \cdot R_{ges} - u_{CA}) \qquad (17)$$

By inserting equations (16) and (17) into equation (3), we finally obtain the required equation for calculating $\Delta t$ by forming the first derivative $d/d\Delta t$ and then setting equation (3) to zero.

Written in the $\alpha$-$\beta$ coordinate system, this equation appears as follows:

$$\Delta t = t_S - t_A = \qquad (18)$$

$$\frac{C \cdot (\Delta u_{C\alpha} \cdot \dot{u}_{C\alpha} + \Delta u_{C\beta} \cdot \dot{u}_{C\beta}) + L \cdot (\Delta i_{L\alpha} \cdot \dot{i}_{L\alpha} + \Delta i_{L\beta} \cdot \dot{i}_{L\beta})}{C \cdot (\dot{u}_{C\alpha}^2 + \dot{u}_{C\beta}^2) + L \cdot (\dot{i}_{L\alpha}^2 + \dot{i}_{L\beta}^2)}$$

where:

$$\Delta u_{C\alpha,\beta} = u_{C0\alpha,\beta} - u_{CA\alpha,\beta} \qquad (19)$$

and $$\Delta i_{L\alpha,\beta} = i_{L0\alpha,\beta} - i_{LA\alpha,\beta} \qquad (20)$$

Equation (18) can be solved under most circumstances and is a very handy expression of the on-line calculation of the next switching time. A plausibility check is needed in order to assess the extent to which the results calculated with this equation are correct or plausible. Switching time $t_S$ to be implemented is calculated on the basis of equation (3), using values that are actually valid at different times:

Reference values include $u_{C0}$, $i_{L0}$ at times $t_0$, which are specified by the optimized pulse patterns selected in each case. The actual values include $u_{CS}$, $i_{LS}$ at actual switching times $t_S$, which do not occur until control takes place.

The switching time that can be calculated by analyzing equation (3) is therefore not completely precise in a mathematical sense (sub-optimum). Due to practical considerations, however, the use of different reference times proves to be necessary, since it greatly simplifies the on-line calculation of the switching time. This calculation is necessary only for discrete times and can therefore be carried out on-line with currently available microprocessors; this avoids performing an iterative calculation of the switching times, which might otherwise be necessary. The use of different reference times is also necessary because it clearly limits the switching frequency; otherwise, a two-step action with an impermissibly high switching frequency could occur.

The accuracy with which the new switching point that is determined on-line can be calculated depends on the time interval between sampling time $t_A$ of the actual status variable values and calculated switching time $t_S$. In this regard, the smaller the interval between the two times, the more accurate the calculation will be. This is due to the fact that constant gradients were assumed for status variables $u_C$ and $i_L$ for the time range between $t_A$ and $t_S$. The best possible control result is then obtained when sampling of the actual values and calculation of the switching times take place directly before performing the switching operation. With the recommended use of a constant computation and sampling period, this means selecting the smallest possible computation and sampling period. The time available for carrying out the calculations can be estimated on the basis of the minimum valve switching times, since each switching operation generally must be recalculated if the dynamic characteristics of the method are to be retained. The switching time to be implemented is not calculated in the form of an absolute time, but rather with reference to the sampling time that is valid during the computation interval. Time $\Delta t = t_S - t_A$ remaining to the next switching operation is thus calculated. Initially, the result is therefore purely mathematical in nature, and the set of solutions covers the entire value range of $-\infty < \Delta t < +\infty$. The mathematical computation result therefore needs to be interpreted, and its validity must also be limited in order to obtain a reference to physical reality. If results which lie within the same magnitude as the switching times of the optimized pulse pattern are obtained when calculating $\Delta t$, it can be assumed that the calculated values are correct. The switching operation then takes place at the calculated time. If a negative expression with a small absolute value is calculated for $\Delta t$, the optimum switching time already occurred before sampling time $t_A$. In this case, immediate switching is the best solution taking minimum switching times into account. "Small" absolute values for $\Delta t$ can thus be unambiguously interpreted and converted to switching operations.

The question now arises as to what to do with "large" absolute values for $\Delta t$, since switching times with $\Delta t \to \pm\infty$ are obviously meaningless, and where the limits between "small" (i.e. correct) and "large" (i.e. incorrect) lie.

"Large" computed absolute values for $\Delta t$ are clearly obtained when the prevailing switching status of the converter is not the most suitable one for reaching the desired energy status for the filter status variables in a short period of time. This can occur (undesirably so), for example, in the case of abrupt disturbance changes, necessitated by operation for fast pulse pattern changes, or even occur in connection with (desired) pulse pattern changes.

Figure 4:
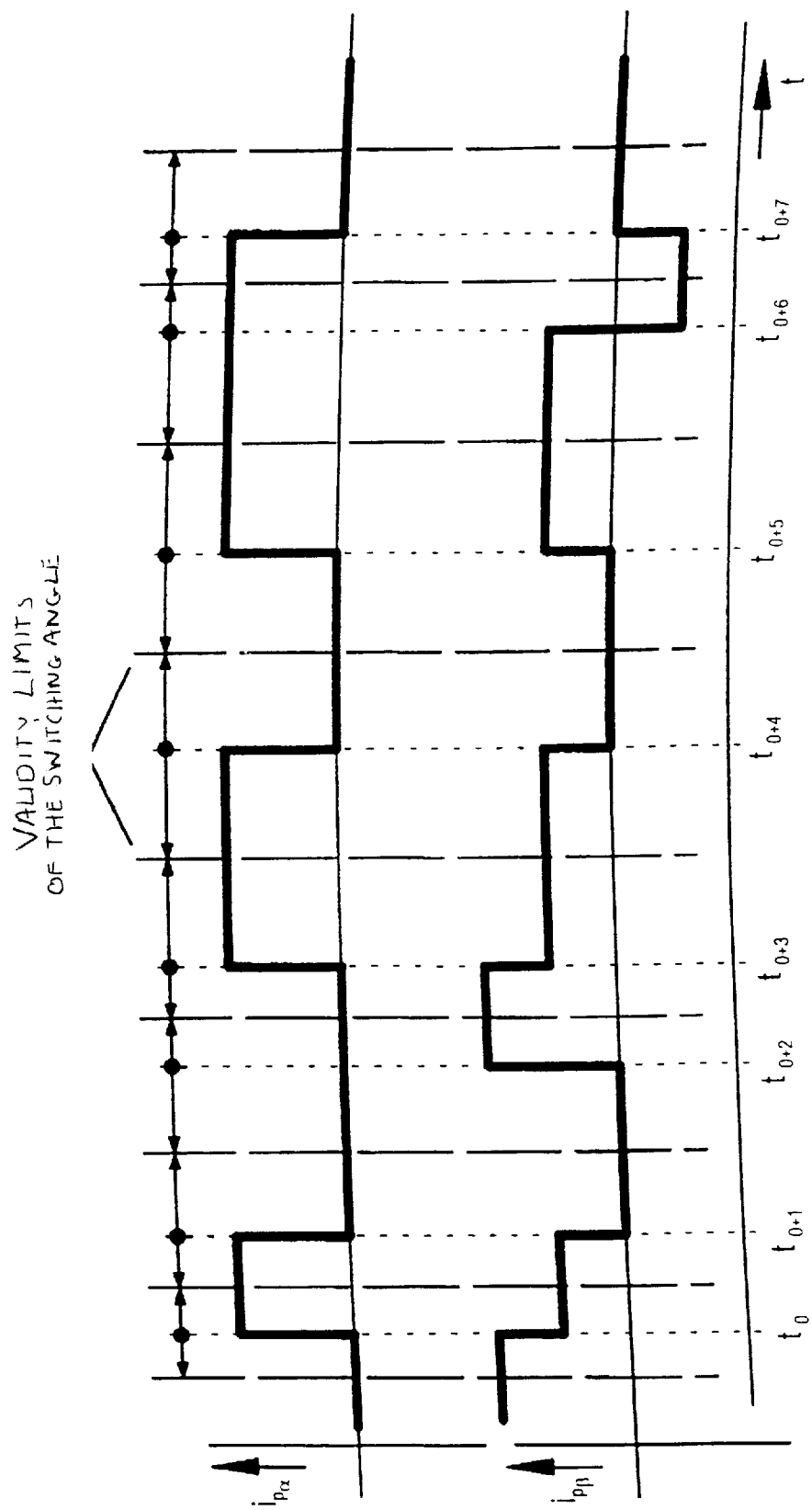
FIG. 4 illustrates a diagram of the validity limits of the calculated switching time or switching angle.

In the case of these types of operating states, which may also necessitate angle jumps in the converter manipulated-variable vector, status-oriented control alone is insufficient, which means that the validity limits for switching times $t_S$ (or for $\Delta t$) must be defined. This is done by specifying a tolerance range for the time difference $(t_S - t_0)$, the exceeding of which forces a controlled changeover to the next switching status of the optimized pulse pattern. In simulation studies conducted for this purpose, it was determined that the greatest possible dynamic characteristics are obtained when the tolerance range is adjusted to the variation over time of the optimized pulse pattern that is valid at the time. The validity limits of the calculated switching times are set in such a way that they match the average of two consecutive switching angles of the optimized pulse pattern. FIG. 4 illustrates these statements. The fact that the converter switching frequency always remains under control, due to the controlled synchronization of status-oriented control, is especially significant, since there are no longer any more meaningless switching times.

The fact that after abrupt signal changes the first switching operation takes place in a controlled manner is of little importance. Any excitation of the resonant filter circuit that may be caused by the non-optimal switching time is effectively damped by status-oriented control, which takes effect no later than the next sampling interval. Although in theory this procedure permits only sub-optimal use of the dynamic characteristics that can be obtained, it does provide standard treatment of all abrupt commutation and disturbance changes.

In order for the average of two consecutive switching angles of the optimized pulse pattern to be determined, apparatus 34, which performs a plausibility check, is supplied with two consecutive switching times $t_0$ and $t_{0-1}$ from pulse pattern storage device 26. In order for the tolerance range to be adjusted to the variation over time of the optimized pulse pattern that is valid at the time, reference switching state $s_0$ is also supplied to apparatus 34 from pulse pattern storage device 26. Apparatus 34 is also used to monitor compliance with the minimum turn-on and turn-off times.

The question of whether the next switching state $S_0$ taken from the optimized pulse pattern differs from switching state $S_A$ already present in the sampling interval is checked in another step. If it does differ, switching state $S_0$ is transferred to trigger equipment 28 at time $t_S$ as executable switching state vector $S_S$. In order for this check to take place, switching state $S_A$, which is already present during the sampling interval, is transferred to apparatus 34 from trigger equipment 28. Trigger equipment 28, also known as the control electronics, generates control signals $S_V$ from switching state vector $S_S$ for the power semiconductor device of control element 2. In doing so, the valve locking conditions, among other things, are implemented (preferably with hardware).

In order to reduce the number of measuring elements required, the actual value of status variable $i_P$ that is actually needed for status controller 32 is determined by measuring link current $i_{ZW}$, whereby known valve switching status $S_A$ present during the sampling interval makes it possible to map the link current onto the three phases of the line side of control element 2. The status controller then works with model signal $i_{PM}$ obtained in this manner. Model signal $i_{PM}$ is generated by means of a simplified control element model 36 as a function of a present switching state $S_A$ and measured link current $i_{ZW}$. An apparatus 38, which is connected on the input side to power line 6, generates fundamental frequency line voltage $u_{Netz(1)}$, and supplies this signal to apparatus 30 in order to calculate a reference value $u_{C0}$ and $i_{L0}$ of the four-dimensional vector. Apparatus 38 also supplies its output signal fundamental frequency reference value calculator 24. Since the selection of a pulse pattern that is suitable for the (quasi)-steady-state working point is based on the exclusive use of a fundamental frequency view of the system, the line voltage measured at sampling times $t_A$ must be smoothed, using a band-pass filter, for example.

The simulation results are presented in FIGS. 5 to 10. These results show the control element performance when using the new modulation and control method as compared to a conventional control circuit with optimized pulse patterns.

The studies were carried out primarily for operating situations which meet the typical requirements of practical use and in which an especially pronounced excitation of the resonant filter circuit can be expected.

Figure 5:
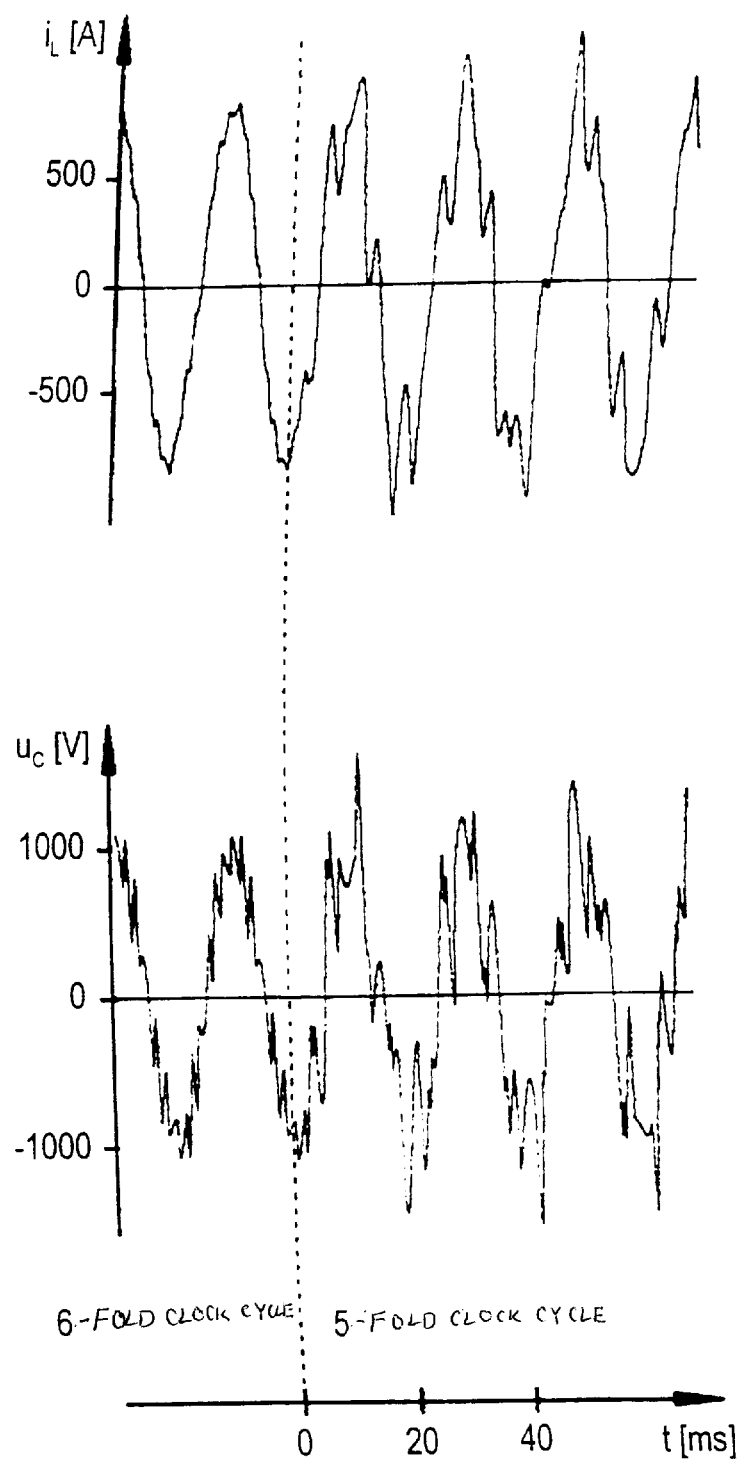
FIG. 5 illustrates a diagram of status variables $i_L$ and $u_C$ without the method according to the invention.
Figure 6:
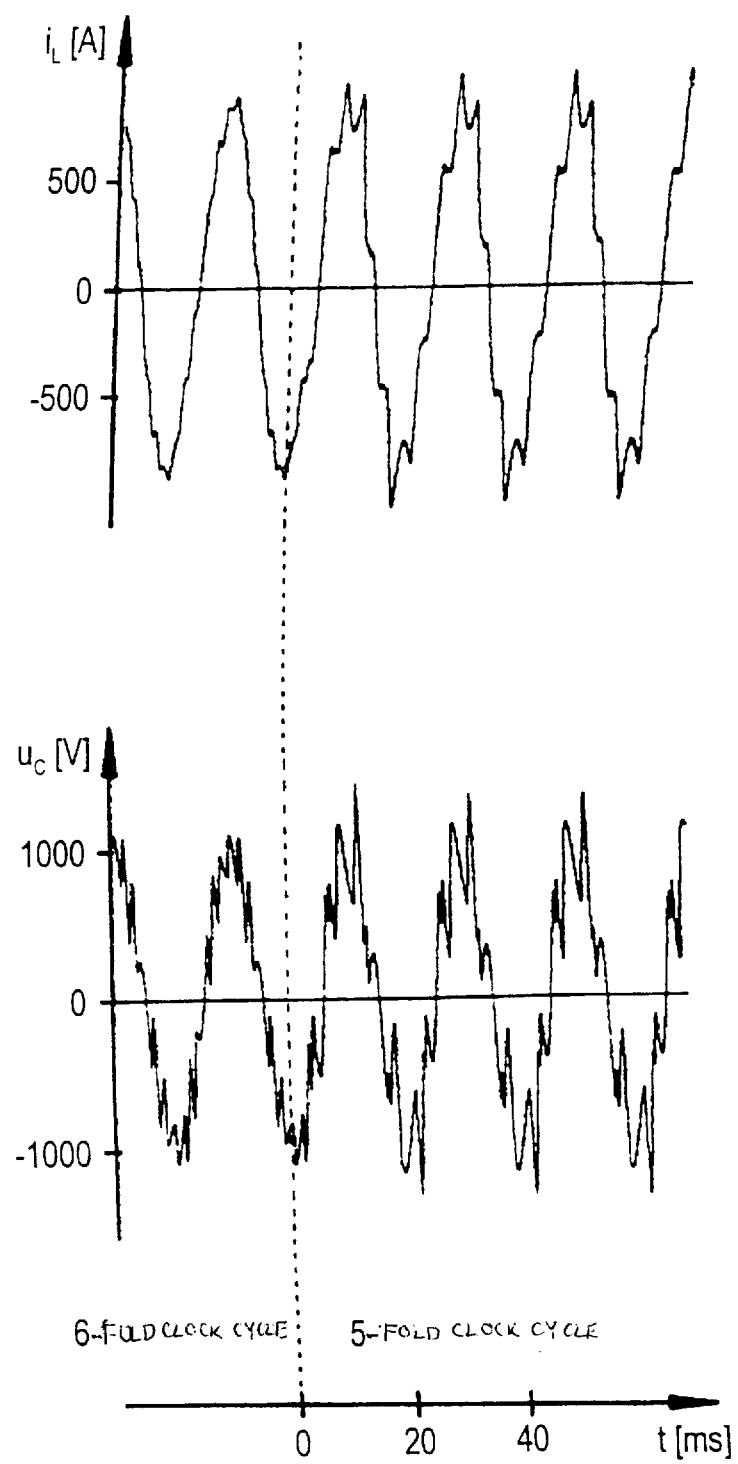
FIG. 6 illustrates the same variables with the method according to the invention.

FIGS. 5 and 6 show the dynamic behavior of the reference variable when the pulse pattern changes. With the aid of status-oriented control, it is possible to change the pulse pattern at any desired point in time. Much higher dynamic characteristics can therefore be achieved during reference variable changes than is possible with the sole use of a control circuit with optimized pulse patterns. FIGS. 5 and 6 show the transition from six-phase to five-phase timing as a characteristic example. As seen in FIG. 5, the new steady-state operating point is reached as early as approximately half a supply period with very little overshooting. On the other hand, as demonstrated by FIG. 5, the transient process when using optimized pulse patterns is only very slightly damped and is associated with marked current and voltage overshooting.

Figure 7:
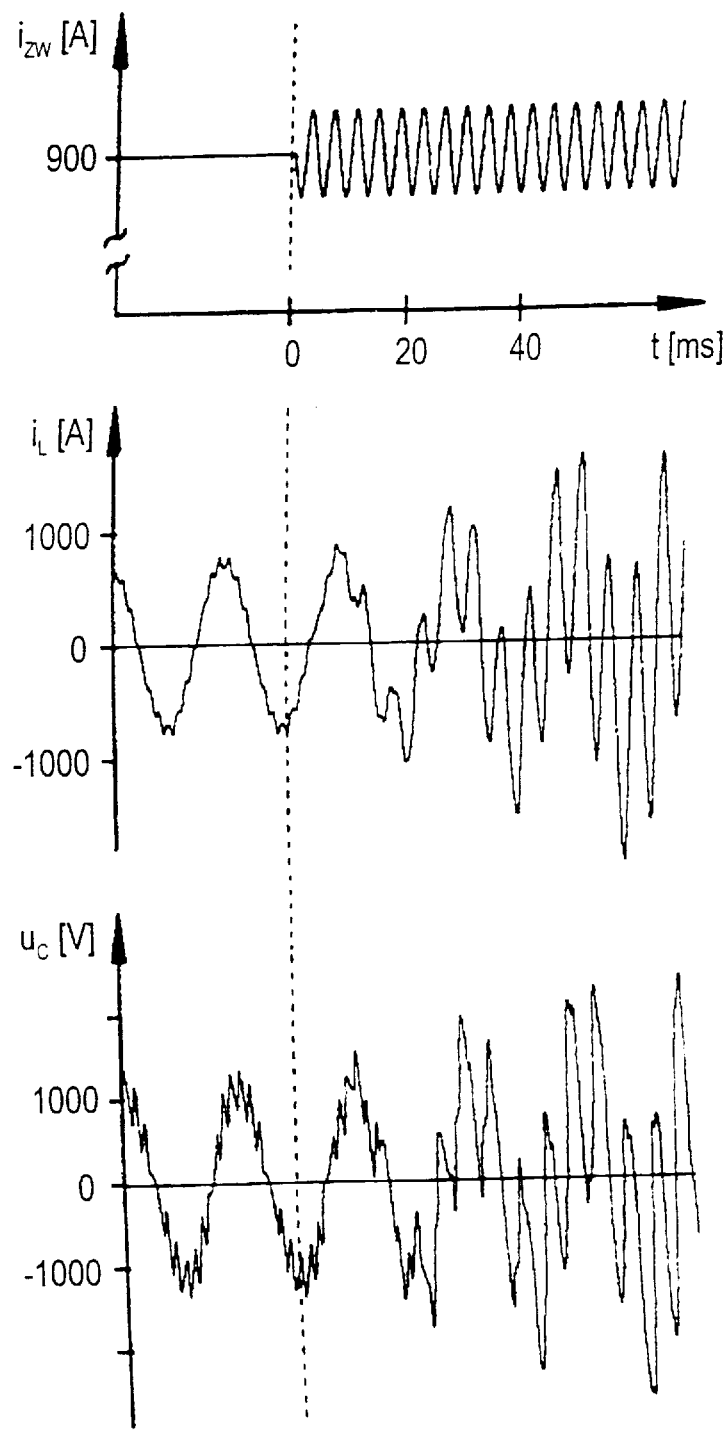
FIG. 7 illustrates a diagram of status variables $i_L$ and $u_C$ for an interharmonic vibration excitation of a filter circuit in the controlled system without the method according to the present invention.
Figure 8:
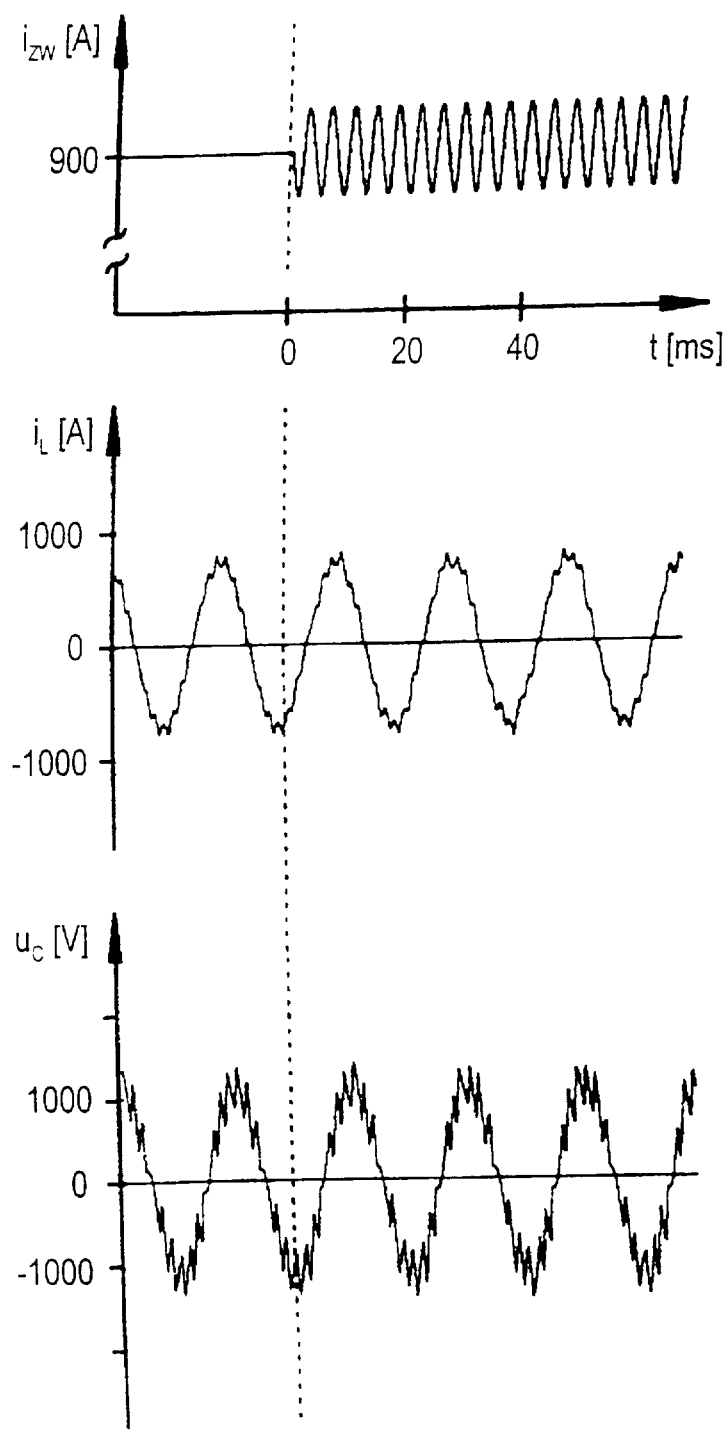
FIG. 8 illustrates a diagram of status variables $i_L$ and $u_C$ for an interharmonic vibration excitation of a filter circuit in the controlled system in accordance with the method according to the present invention.

FIGS. 7 and 8 show active damping of the filter circuit when excited by interharmonic vibrations. The assumption $I_{ZW}$=const. no longer applies with a finite size link reactor 16. For example, reactions in load-side inverter 4 produce a current ripple whose frequency (with 6-pulse inverters) is 6 times the fundamental frequency on the load side: $f_{ZW}$=6× $f_{masch}$. Superimposing the line frequency on the pulsating link current produces mixed frequencies on the converter system line side which generally are not integral multiples of the line frequency. They are generally referred to as interharmonics.

FIGS. 7 and 8 show the simulation results for this type of situation. Line current $i_L$ and capacitor voltage $u_C$ are compared when modulating control element 2 with optimized pulse patterns (FIG. 7) and when modulating it with superimposed, status-oriented control (FIG. 8). The link current ripple produced by the load-side inverter is simulated by a sinusoidal disturbance at frequency $f_{ZW}$. Frequency $f_{ZW}$ is selected so that $f_{ZW}=f_{Res}+f_L$ will induce maximum excitation of the resonant filter circuit. The line-side converter is pulsated with 6-phase timing and a modulation factor of A=0.72. Due to status-oriented control (FIG. 8), it is possible to effectively damp the resonant filter circuit, even though a deviation from the control reserve is necessary for complete correction of disturbances. Reasons for incomplete correction of disturbances can include, for example, minimum time problems at the modulation limit of the pulse pattern concerned. Nevertheless, effective, active damping of the resonant filter circuit is achieved in each case.

Figure 9:
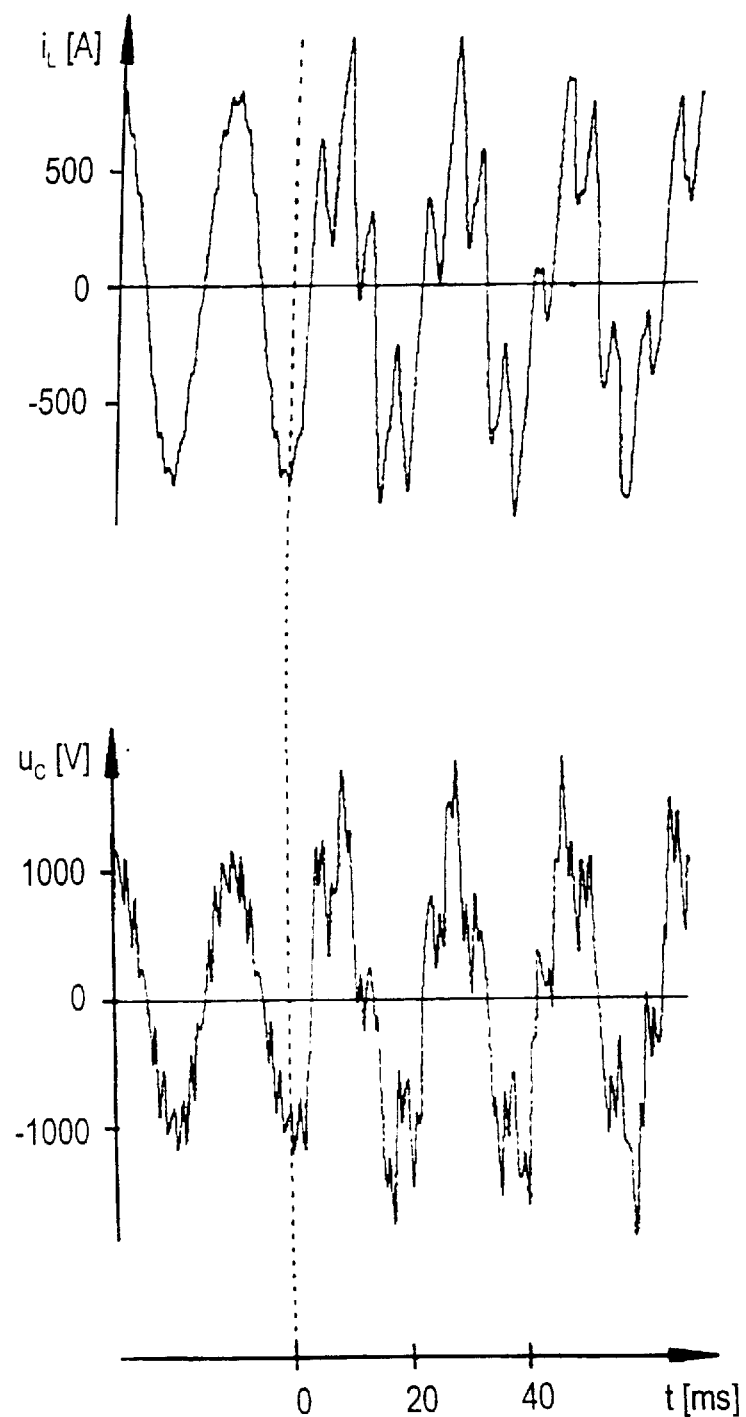
FIG. 9 illustrates a diagram of the transient behavior of status variables $i_L$ and $u_C$ with an abrupt excitation of the line voltage without the method according to the invention.
Figure 10:
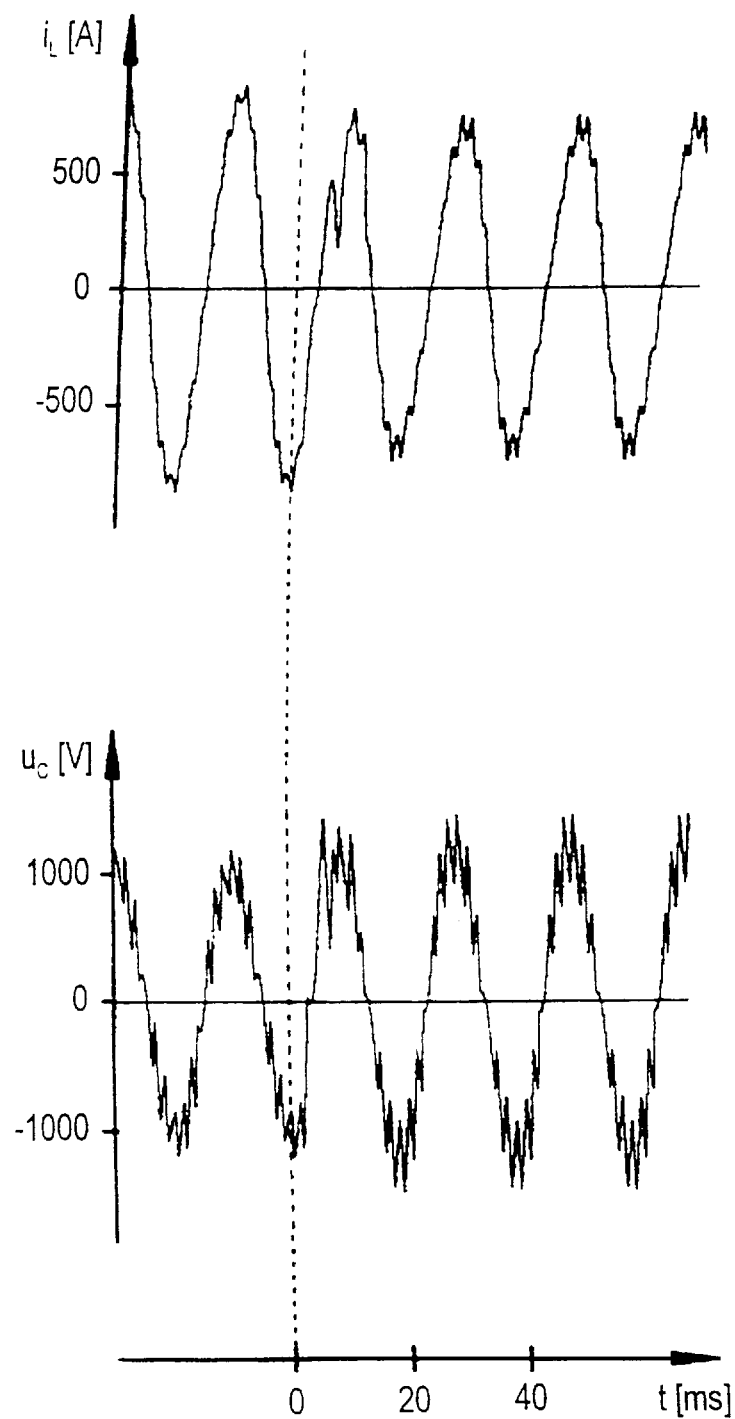
FIG. 10 illustrates a diagram of the transient behavior of status variables $i_L$ and $u_C$ with an abrupt excitation of the line voltage in accordance with the method according to the present invention.

FIGS. 9 and 10 show the transient behavior during line disturbances. In practice, control element 2 can be affected by disturbances in the supply system in many different ways. Aside from harmonics in line voltage $u_{Netz}$, which are almost always present, these disturbances include, for example, brief interruptions, single-phase or multi-phase short-circuits and system transfers. An especially important consideration in the simulation study was the extent to which abrupt changes in the power supply status can be brought under control by the new control method without necessitating emergency shutdown actions. One example involves an examination of abrupt changes in line voltage $u_{Netz}$, which can be produced, for example, by switching in (internal) power plant auxiliary service supply systems.

FIGS. 9 and 10 show this type of simulated operation in which a change in line voltage by +20% and a power angle jump by +28° el. is assumed. Controlled only by the optimized pulse pattern (FIG. 9), reasonable operation of control element 2 is no longer guaranteed after this type of disturbance. The converter would also have to be greatly overdimensioned in order to avoid protective shutdown. Nevertheless, these and other line disturbances can be managed with a status-oriented control method (FIG. 10). Correcting these types of high-level signal disturbances takes place in two steps. In the first step, the new switching state is specified in a controlled manner, with the switching state changing as fast as possible, taking the minimum switching time into account. The actual status-oriented control method does not take effect until the second step, when the best possible active damping of the oscillating circuit is carried out by means of on-line calculation of the switching times. Conversely, harmonics in line voltage $u_{Netz}$ are equivalent to low-level signal disturbances and can also be managed without problem using the status-oriented control method. The control behavior is in principle the same as when suppressing interharmonic excitation of the resonant filter circuit.

The modulation and control method presented according to the invention combines the advantages of pulse patterns optimized off-line (high steady-state quality) with the high dynamic characteristics of status-oriented control. The simulation results substantiate the simple control method using optimized pulse patterns. Effective damping of the resonant filter circuit is achieved by means of status-oriented control, although an adequate control reserve is necessary in order to completely compensate for disturbances. This method according to the invention is intended not only for specific use with an impulse-commutated line-side converter in high-power current-source converter drives, but also lends itself to load-side inverters. The basic ideas behind the control method presented can also be applied to voltage-source PWM inverters and line- or load-side filters. In this case, a constant link voltage must be assumed for on-line calculation of the reference energy values.

What is claimed is:

1. A method for controlling a four-dimensional vector for a controlled system using a discrete-value control element, the discrete-value control element having a limited switching frequency, the method comprising the steps of:

selecting a reference switching status from a pulse pattern table as a function of a modulation factor and a fundamental frequency phase angle, the reference switching status having an associated first switching time;

calculating at least one reference value of the four-dimensional vector at the associated first switching time as a function of a selected pulse pattern, the reference switching status, a control element reference output value, a determined fundamental component of a voltage of the controlled system, and a plurality of controlled system parameters;

calculating a time remaining to a next switching operation so as to minimize a difference between the calculated at least one reference value and an actual value of the four-dimensional vector at an actual switching time;

performing a plausibility check of the calculated time remaining as a function of at least one switching time limit value;

providing the selected reference switching status as a required switching status at the actual switching time as a function of the plausibility check; and generating a plurality of control signals for the discrete-value control element as a function of the required switching status.

2. The method according to claim 1, wherein step of performing the plausibility check includes the steps of:

determining if the selected reference switching status differs from an existing switching status; and providing one of the reference switching status and the existing switching status as the required switching status.

3. The method according to claim 1, further comprising the step of:

calculating a limit value for a time when a switching operation is to be performed a function of the first selected switching time and a second consecutive selected switching time.

4. A device for controlling a four-dimensional vector for a controlled system using a discrete-value control element with a limited switching frequency, comprising:

a fundamental frequency reference value calculator;

a pulse pattern storage device coupled to the fundamental frequency reference value calculator;

a trigger device having at least one output, the at least one output coupled to at least one input of the discrete-value control element;

a reference value calculation apparatus, coupled to the pulse pattern storage device, for calculating at least one reference value of the four-dimensional vector, the reference value calculation apparatus including at least one input for receiving a plurality of controlled system parameters;

a plausibility apparatus, coupled to the pulse pattern storage device, for performing a plausibility check, at least one output of the plausibility apparatus coupled to at least one input of the trigger device;

an actual switching time calculation apparatus, coupled to at least one output of the reference value calculation apparatus, for calculating an actual switching time, at least one output of the actual switching time apparatus coupled to at least one input of the plausibility apparatus, the actual switching time apparatus including at least one input for receiving the plurality of controlled system parameters and at least one input for receiving a plurality of actual values of the controlled system; and an apparatus coupled to the reference value calculation apparatus and to the fundamental frequency reference value calculator, for generating a fundamental component of a controlled-system quantity.

5. The device according to claim 4, further comprising:

a simplified control element apparatus for determining an actual control element input value, at least one input of the simplified control element apparatus being coupled to an output of the discrete-value control element, and at least one input of the simplified control element being coupled to at least one output of the trigger equipment, and the trigger equipment providing a switching state to the simplified control element.

6. The device according to claim 4, wherein the reference value calculation apparatus and actual switching time calculation apparatus include a high-speed computer.

7. The device according to claim 6, wherein the high-speed computer includes a signal processor.

* * * * *